(12) United States Patent
Smith

(10) Patent No.: US 9,372,909 B2
(45) Date of Patent: Jun. 21, 2016

(54) DEFINING A SET OF DATA ACROSS MUTIPLE DATABASES USING VARIABLES AND FUNCTIONS

(75) Inventor: Francis Smith, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 459 days.

(21) Appl. No.: 11/748,734

(22) Filed: May 15, 2007

(65) Prior Publication Data

US 2008/0288503 A1 Nov. 20, 2008

(51) Int. Cl.
*G06F 17/30* (2006.01)

(52) U.S. Cl.
CPC .... *G06F 17/30584* (2013.01); *G06F 17/30412* (2013.01)

(58) Field of Classification Search
None
See application file for complete search history.

(56) References Cited

U.S. PATENT DOCUMENTS

| | | | | |
|---|---|---|---|---|
| 5,442,782 | A | * | 8/1995 | Malatesta et al. .................. 707/4 |
| 5,678,039 | A | * | 10/1997 | Hinks et al. ....................... 707/4 |
| 5,835,912 | A | * | 11/1998 | Pet .............................. 707/104.1 |
| 5,974,418 | A | * | 10/1999 | Blinn et al. ..................... 707/100 |
| 6,233,578 | B1 | * | 5/2001 | Machihara ........ G06F 17/30424 |
| 2003/0229900 | A1 | * | 12/2003 | Reisman ......................... 725/87 |
| 2006/0010119 | A1 | * | 1/2006 | Jonas ................................. 707/3 |
| 2006/0059253 | A1 | * | 3/2006 | Goodman et al. ............. 709/223 |
| 2006/0288001 | A1 | * | 12/2006 | Costa ................. G06F 17/30864 |
| 2007/0168327 | A1 | * | 7/2007 | Lindblad ........... G06F 17/30911 |
| 2008/0201293 | A1 | * | 8/2008 | Grosset ............. G06F 17/30592 |

* cited by examiner

*Primary Examiner* — Bai D. Vu
(74) *Attorney, Agent, or Firm* — Schwegman Lundberg & Woessner, P.A.

(57) ABSTRACT

A method for defining grouping of data, across multiple data sources using variables and functions, may include defining grouping of data corresponding to one or more entities across multiple data sources, using a generic language that relates to multiple entities. The method may include providing access to the data based on Data-Dependent Routing (DDR), using variables and functions defined by the generic language. According to example embodiments, the system may include a user interface to receive one or more statements belonging to the generic language and present data accessed via the one or more statements. The system may also include a processor to execute statements and to provide access to the data. The system may further include a server to host the multiple data sources.

21 Claims, 13 Drawing Sheets

DEFINING A SET OF DATA ACROSS MUTIPLE DATABASES USING VARIABLES AND FUNCTIONS

TECHNICAL FIELD

Example embodiments relate generally to the technical field of data management, and in one specific example, to the use of variables and functions for defining a set of data across multiple databases.

BACKGROUND

As the use of computers and the Internet become more widespread, especially amongst the new generation, on the one hand, new data is generated at a faster rate, and on the other hand, the need for efficient search engines to access data stored in various databases become more eminent. People use search tools such as GOOGLE and YAHOO to learn about the latest news, to find items, to look up addresses, to reserve tickets, to find answers to many of their questions and the like. One of the areas in which databases are playing a major role is in ecommerce. Everyday, millions of people participate in some kind of electronic business where they not only use databases, but they also contribute to the data existing in those sources.

With the increase in volume of data, more sophisticated data management techniques have to replace rudimentary methods. As a database application expands to service millions of global customers for example, scale-out architectures may need to replace hosting large databases on a single mainframe-class machine.

Several approaches to scale-out are well-known in the art. An information repository may be horizontally partitioned by dividing it into several segments, each storing data related to a specific category of information (e.g., customer data, inventory data, employee data, and so on). Data may also be stored in so-called rule-based servers. In a rule based server, the server has to verify whether a service request meets certain application-specific criteria before forwarding the request to service routines (e.g., making sure a student is registered before allowing the student access to a university online library.) In distributed data sources, data stored on several servers may be accessed by distributed applications consisting of one or more local or remote clients that are connected to one or more servers on several machines linked via a network. In this distributed application scheme, the address of the request may be embedded in the data, so that the data identifies the server that may fulfill the request.

In all approaches to scale out e.g. horizontally partitioned data, rule based databases and distributed applications, a method called Data Dependent Routing (DDR) may be used to partition data and access data across multiple sources. DDR may require sufficient intelligence in the client application to route the database request to the appropriate server. With DDR, each federated server may be independent with no view of other servers, except for the sharing of the database schema. The client application in a DDR contains mappings to how the data is partitioned and at which server the requested data may exist.

BRIEF DESCRIPTION OF THE DRAWINGS

Some embodiments are illustrated by way of example and not limitation in the figures of the accompanying drawings in which.

DETAILED DESCRIPTION

Example methods and systems for defining grouping of data across multiple data sources using variables and functions have been described. In the following description, for purposes of explanation, numerous specific details are set forth in order to provide a thorough understanding of example embodiments. It will be evident, however, to one skilled in the art that the present invention may be practiced without these specific details.

A method and a system for defining grouping of data across multiple data sources using variables and functions have been described. In one example embodiment, the method may include defining grouping of data corresponding one or more entities across multiple data sources, using a generic language relating to multiple entities. The method may also include providing access to the data, based on DDR, using variables defined by the generic language. The word generic in the context of the present application may imply that the syntax of the generic language may remain the same when defining grouping of data corresponding to different entities.

According to example embodiments, the method may further provide access to the data, based on DDR, using functions defined by the generic language. The data sources may include one or more of a database schema, a database, a table, or a column. The method may provide a user with locations within the multiple data sources, containing the data corresponding to the one or more entities. The method may further provide the user with access to the data across the multiple data sources without prior knowledge, by the user, of the data sources.

In one example embodiment, the method may use the generic language to enable the user to capture data corresponding to the one or more entities against multiple reference points in time. The method may further enable the user to capture the data corresponding to one or more entities across multiple data sources, using the generic language.

System Architecture

Figure 1:
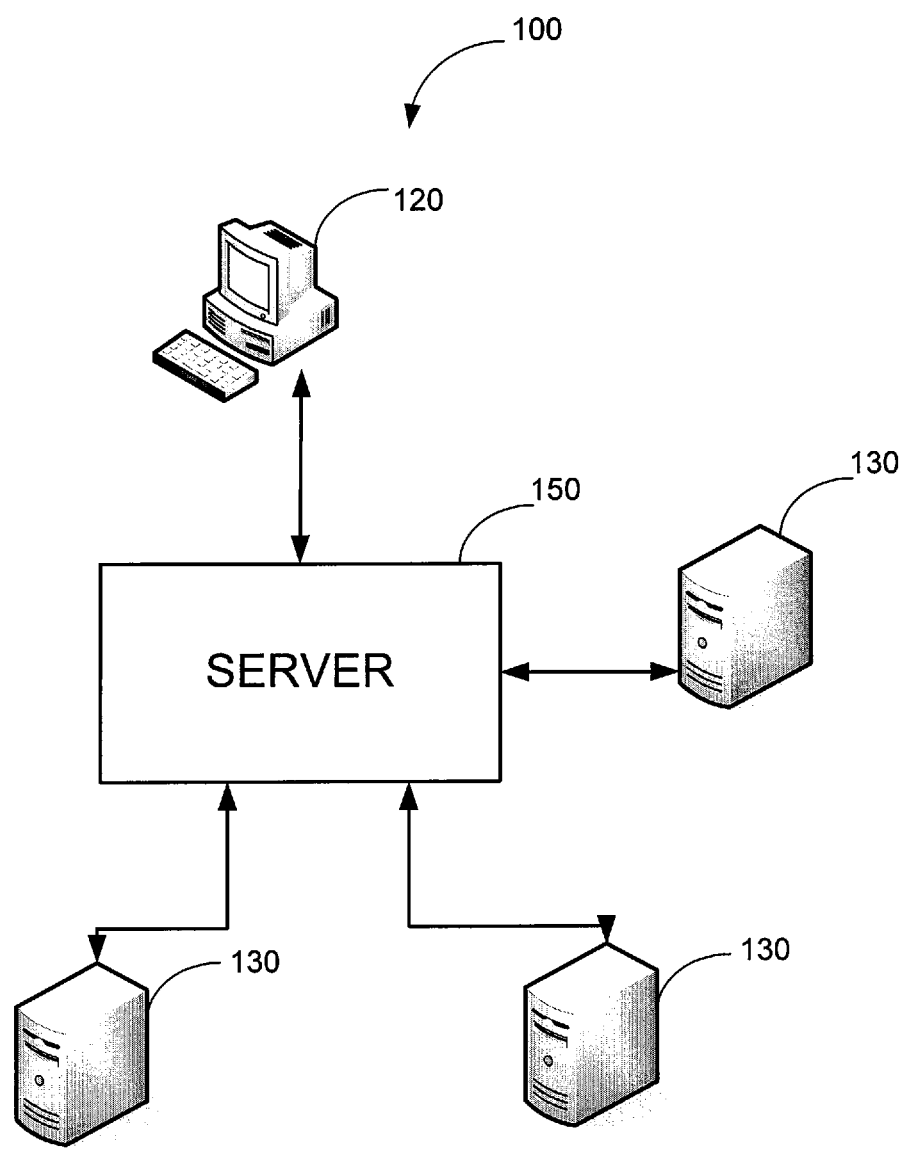
FIG. 1 is a high level diagram depicting an example embodiment of a system for defining grouping of data and accessing data across multiple data sources.

FIG. 1 is a high level diagram depicting an example embodiment of a system 100 for defining grouping of data and accessing data across multiple data sources. In one example embodiment, the system may include a main server 150, a user computer 120 and a cluster of host servers 130. According to an example embodiment, the main server 150 may define the grouping of data corresponding to one or more entities across multiple data sources (e.g., databases, tables, etc.) on the main server 150. In another example embodiment, the main server 150 may use resources (e.g., processors, databases, etc.) of the cluster of host servers 130 to define the grouping of the data and actually store the data on those resources.

In example embodiments, the main server 150, and the cluster of host servers 130 may be linked via a Local Area Network (LAN). The user computer 120 or some of the servers of the cluster of host servers 130 may be linked via a Wide Area Network (WAN), e.g. the Internet.

Figure 2:
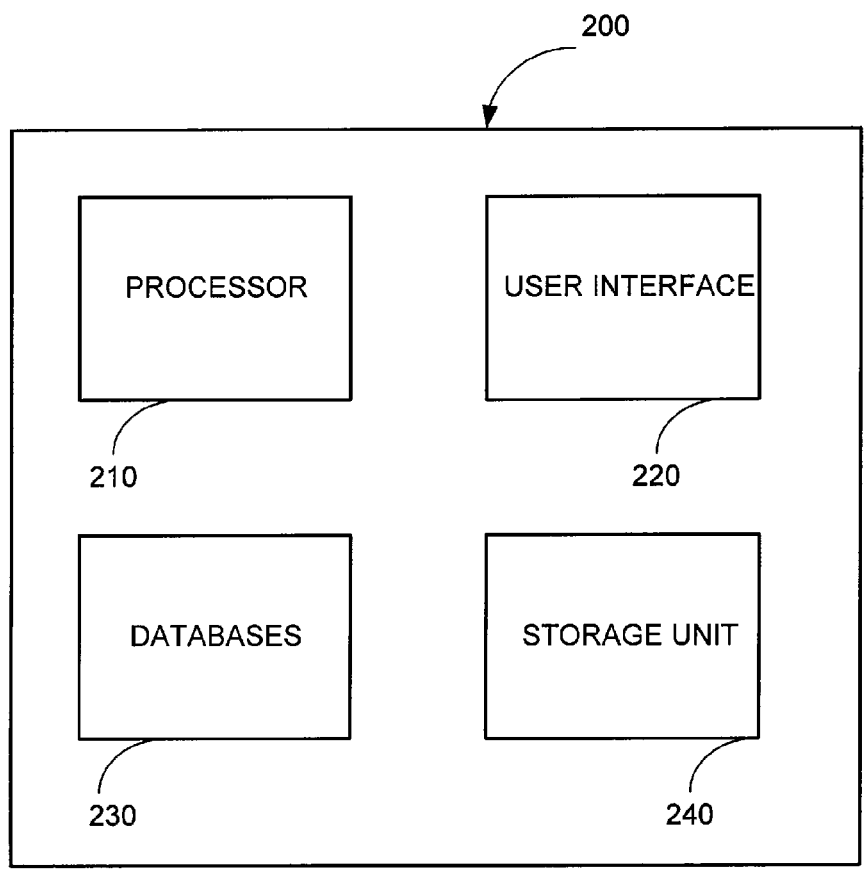
FIG. 2 is a high level block diagram illustrating an example embodiment of a sever in a system for defining grouping of data and accessing data across multiple data sources.

FIG. 2 is a high level block diagram illustrating an example embodiment of a server 200 in a system for defining grouping of data and accessing data across multiple data sources. In an example embodiment, the server 200 may include a processor 210, a user interface 220, a storage unit 240, and databases 230.

In example embodiments, the processor 210 may receive statements of the generic language entered by the user via the user interface 220. The statements may define grouping of data corresponding to one or more entities across multiple data sources including databases 230 and/or data sources located in the cluster of host servers 130 or their corresponding tables and columns.

The processor 210 may store processed statements, or functions and variables defined by the statements of the generic language on the storage unit 240.

In one example embodiment, the processor 210 may process the statements of the generic language received by the user interface 220. As a result of processing the statements, the processor 210 may define grouping of data corresponding to one or more entities across multiple data sources including databases 230 and/or data sources located in the cluster of host servers 130 or their corresponding tables and columns.

The processor 210 may also access the storage unit 240 to retrieve functions and variables defined by the statements of the generic language. The processor 210 may also store the data corresponding to one or more entities in the databases 230 and/or data sources located in the cluster of host servers 130 or their corresponding tables and columns.

Figure 3:
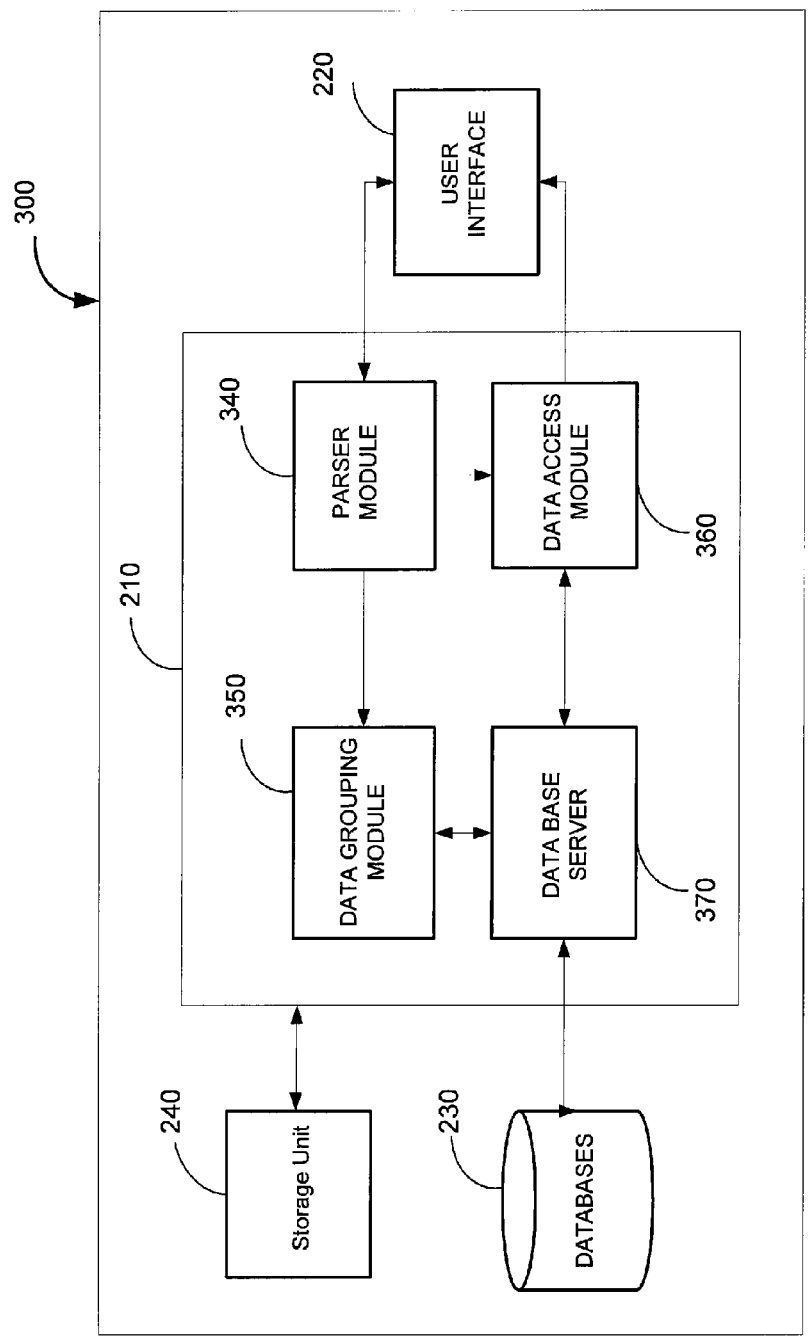
FIG. 3 is a block diagram illustrating another example embodiment of a server in a system for defining grouping of data and accessing data across multiple data sources.

FIG. 3 is a block diagram illustrating an example embodiment of a server 300 in a system for defining grouping of data and accessing data across multiple data sources. The server 300 may include the processor 210, the user interface 220, the storage unit 240, and the databases 230. The processor 210 may include a parser module 340, a data grouping module 350, a data access module 360 and a database server 370.

According to example embodiments, the parser module 340 may analyze the grammatical structure of an input received via the user interface 220, with respect to the given formal grammar of the generic language. The parser module 340 may transform the input text into functional components and data structures that may be processed easily by the data grouping module 350 and the data access module 360. The parser module 340 may turn a stream of statements of the generic language into a syntax tree and identify definitions and rules embedded in the statements, according to the conventions of a grammar which is the "program" of the parser. This may enable the parser module 340 to determine which definition or rule should be passed to either of the data grouping module 350, or the data access module 360. According to an example embodiment, the parser module 340 may confirm syntactic accuracy in the statements of the generic language prior to further processing of the statements.

The data grouping module 350 may receive statements parsed by the parser module 340 and directed to the data grouping module 350. The data grouping module 350 may process the parsed statements to recognize one or more entities identified by the parsed statements of the generic language. The data grouping module 350 may proceed by defining grouping of the data associated with one or more entities identified by the parser module 340 across databases 230 and/or data sources located in the cluster of host servers 130 or their corresponding tables and columns.

In example embodiments, the data access module 360, in response to receiving parsed statement from the parser module 340 specifying the data and the data sources, may access the data source and retrieve the data. The data sources may be the databases 230 and/or data sources located in the cluster of host servers 130. The data access module 360 may use the functions and variables defined by the generic language, based on DDR, to retrieve data from multiple data sources. As described in the background section, the data may be partitioned horizontally across data sources, distributed amongst rule based servers, or distributed based on a distributed application scheme. In each of the schemes, the DDR method may be used to access the data across multiple data sources.

The database server 370, according to an example embodiment, may be reached by the data grouping module 350 and the data access module 360 to facilitate access to the databases 230. In one example embodiment, the database server 370 may also provide access to other data sources such as the cluster of host servers 130.

According to example embodiments, the processor 210 may store parsed statements, as well as the variables and functions defined by the generic language and identified by the parser module 340 in the storage unit 240. The processor 210 may also retrieve the stored variables and functions from the storage unit 240. The retrieved variables and functions may be used by the data grouping module 350 or the data access module 360 to define grouping of data or access the data stored in the data sources.

Figure 4:
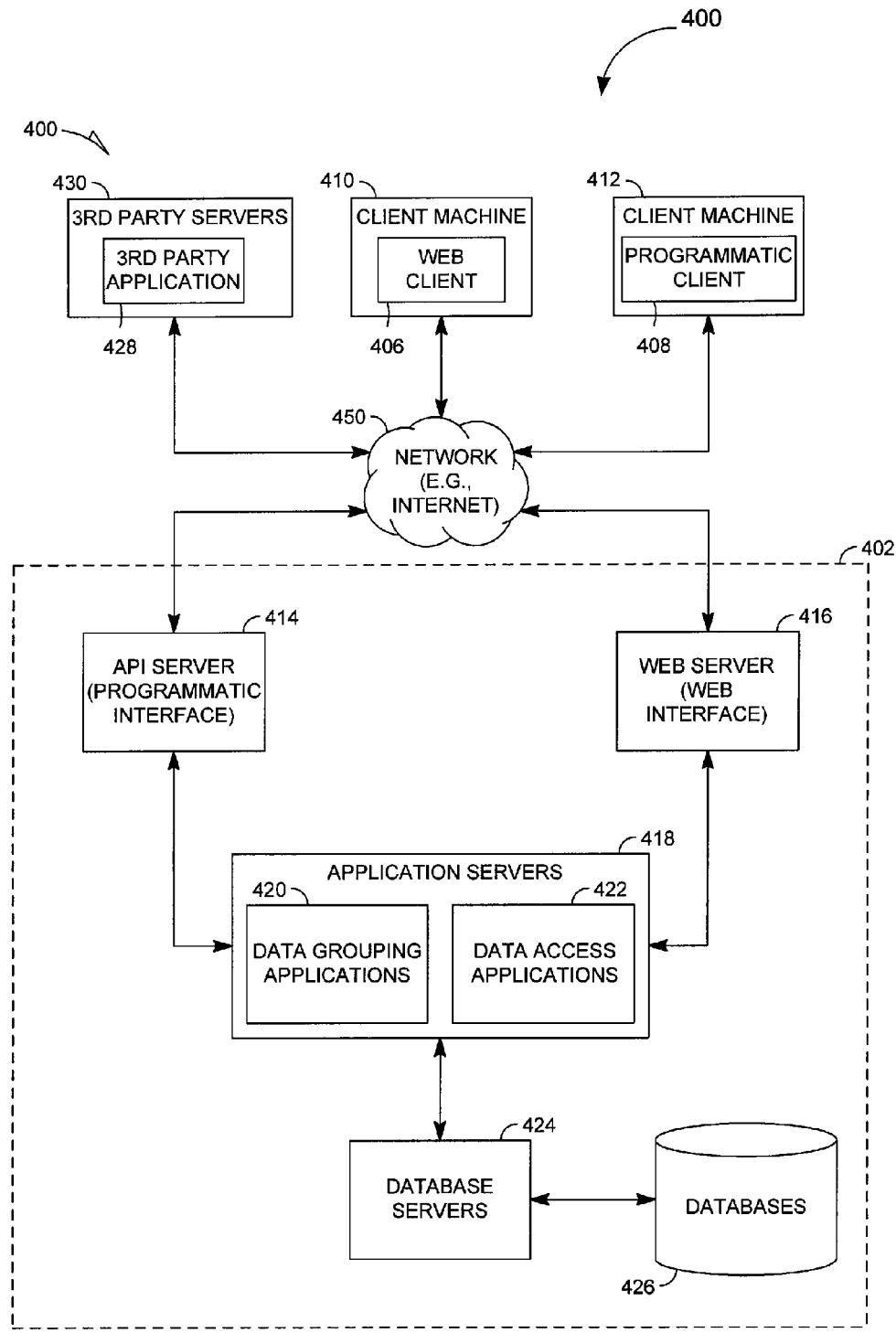
FIG. 4 is a network diagram depicting a system, according to one example embodiment, having a client-server architecture.

As mentioned before, the data sources (e.g. the cluster of host servers 130), the user computer 120 and the main server 150 may be linked via a network connection (e.g., 450 in FIG. 4). The main server 150 may be represented by a marketplace server 402 of a networked base commerce system 400 as is the case in the system of FIG. 4.

FIG. 4 is a network diagram depicting a system 400, according to one example embodiment, having a client-server architecture. A commerce platform, in the example form of a network-based marketplace server 402, provides server-side functionality, via a network 450 (e.g., the Internet) to one or more clients. FIG. 4 illustrates, for example, a web client 406

(e.g., a browser, such as the INTERNET EXPLORER browser developed by Microsoft Corporation of Redmond, Wash.), and a programmatic client 408 executing on respective client machines 410 and 412.

Turning specifically to the network-based marketplace server 402, an Application Program Interface (API) server 414 and a web server 416 are coupled to, and provide programmatic and web interfaces respectively to, one or more application servers 418. The application servers 418 host one or more data grouping applications 420 and data access applications 422. The application servers 418 are, in turn, shown to be coupled to one or more databases servers 424 that facilitate access to one or more databases 426.

The data grouping applications 420 may provide functionalities, such as defining grouping of the data associated with one or more entities across databases 426 and/or data sources located in the third party servers 430 or their corresponding tables and columns. The data access applications 422 may use the functions and variables defined by the generic language, based on DDR, to retrieve data from multiple data sources (e.g., databases 426 and/or third party servers 430 or their corresponding tables and columns. The data may be partitioned horizontally across the data sources, distributed amongst rule based servers, or distributed based on a distributed application scheme. In each of the schemes the DDR method may be used to access the data across the multiple data sources.

Further, while the system 400 shown in FIG. 4 employs a client-server architecture, the present invention is of course not limited to such an architecture, and could equally well find application in a distributed, or peer-to-peer, architecture system. The various data grouping and data access applications 420 and 422 could also be implemented as standalone software programs, which do not necessarily have networking capabilities.

The web client 406 may access the data grouping and data access applications 420 and 422 via the web interface supported by the web server 416. Similarly, the programmatic client 408 may access the various services and functions provided by the data grouping and data access applications 420 and 422 via the programmatic interface provided by the API server 414. The programmatic client 408 may, for example, be a seller application (e.g., the TurboLister application developed by eBay Inc., of San Jose, Calif.) to enable sellers to author and manage listings on the marketplace server 402 in an off-line manner, and to perform batch-mode communications between the programmatic client 408 and the network-based marketplace server 402.

FIG. 4 also illustrates third party applications 428, executing on third party servers 430, as having programmatic access to the network-based marketplace server 402 via the programmatic interface provided by the API server 414. For example, the third party applications 428 may, utilizing information retrieved from the network-based marketplace server 402, support one or more features or functions on a website hosted by the third party.

Figure 5:
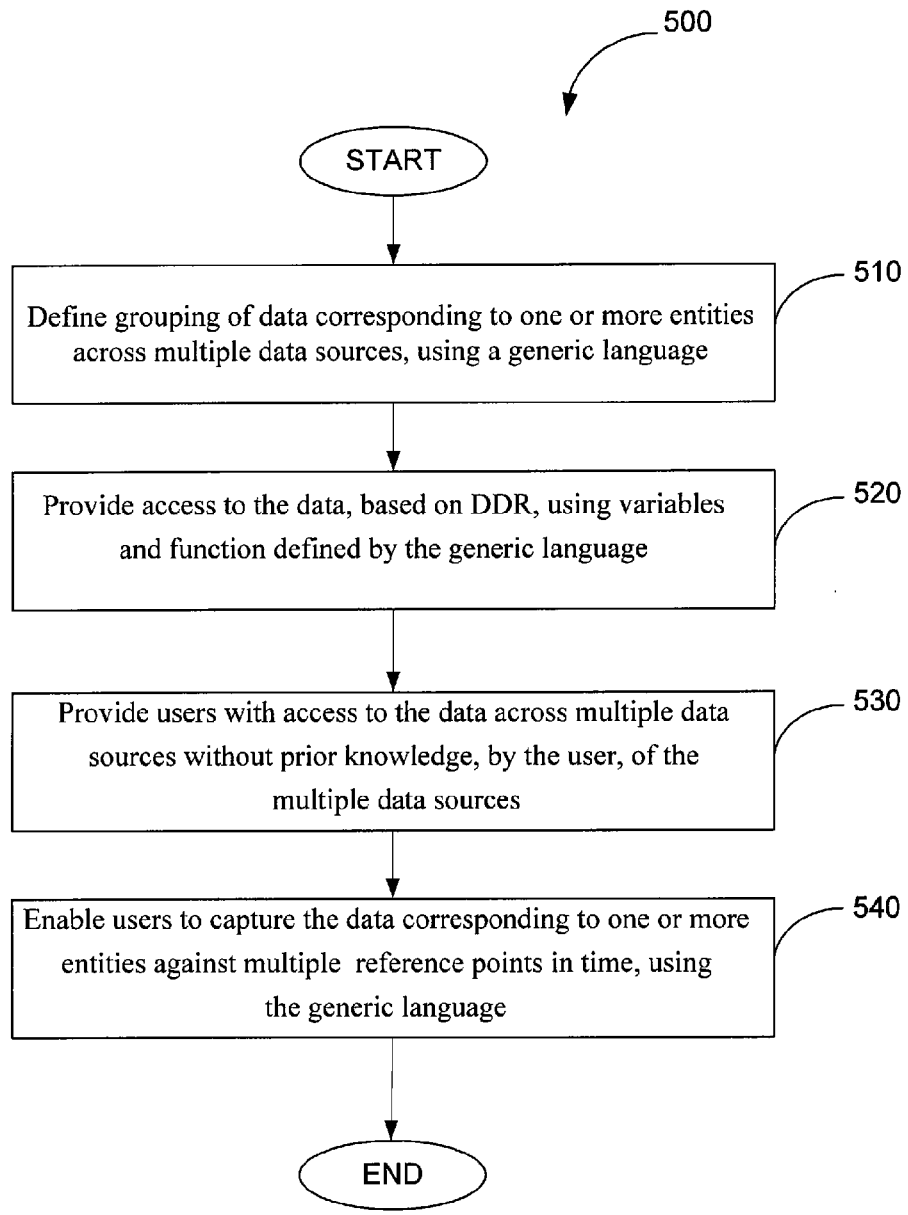
FIG. 5 is a flow diagram illustrating an example embodiment of a system for defining grouping of data and accessing data across multiple data sources.

FIG. 5 is a flow diagram illustrating an example embodiment of a method 500 for defining grouping of data and accessing data across multiple data sources. The method 500 starts at operation 510, where the data grouping module 350 may define grouping of data corresponding to one or more entities, identified by the parser module 340, across multiple data sources (e.g., the databases 230, and/or data sources located in the cluster of host servers 130, or databases 426 and/or third party servers 430, or their corresponding tables and columns.).

According an example embodiment, the method 500, at operation 520, may provide access to the data, using the data access module 360 (or the data access applications 422). The data access module 360 may access the data, based on DDR, using variables and functions defined by the generic language and identified by the parser module 340.

At operation 530, the method 500 may use the data access module 360 and the database server 370, or the data access applications 422 to access multiple data sources (e.g., the databases 230, and/or data sources located in the cluster of host servers 130, or databases 426 and/or third party servers 430, or their corresponding tables and columns).

The method 500, at operation 540, may enable users to capture data corresponding to one or more entities, identified by the parse module 340 from statements of the generic language provided by the user, against multiple reference points in time. (e.g., listings associated with a customer entered between Jan. 15, 2001 and Mar. 28, 2007) This feature of the generic language will be discussed in more details below.

Examples of generic language statements usage in the operations of method 500 may be found in the lists presented in FIGS. 6-8 described below. In the following, when describing the functionality of various example statements of the generic language, it is assumed that the described functionality is realized after the execution of the statement by the processor 210. In other words, in the following, stating that statement n performs function X, implies that the statement n when executed by the processor 210, may perform the function X.

Figure 6:
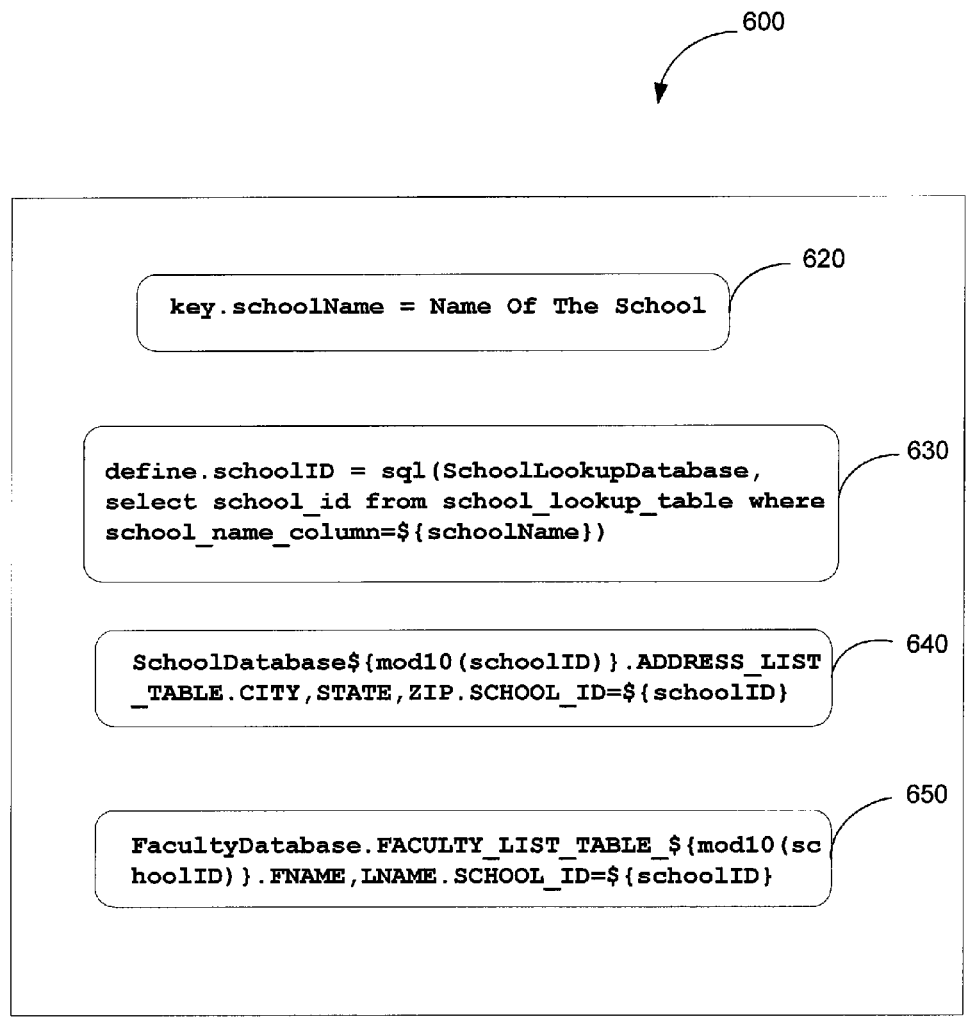
FIG. 6 is a list of statements illustrating an example embodiment of the use of the generic language in retrieving information related to a school.

FIG. 6 is a list 600 of statements illustrating example embodiments of the use of the generic language in retrieving information related to a school. The example demonstrates how the location of a school and the names of faculty members serving at the school are retrieved from the multiple databases (e.g., the databases 230, and/or data sources located in the cluster of host servers 130, or databases 426 and/or third party servers 430, or their corresponding tables and columns.)

The example of the generic language shown in FIG. 6 may be referred to as a "Definition". The person using this Definition will be prompted for the name of the school (statement 620). When the Definition is processed, executing statement 630, an identification (ID) number for the school is retrieved based on the name of the school. Next, the location of the school and the names of the faculty members are retrieved with the so-called "Rules" in the statement 640 and 650. The school's city, state, and zip code are retrieved from one of several databases with the first Rule (640), while the first and last names of faculty members are retrieved from a single (but different) database with the second Rule (650).

The first Rule (640) is an example of DDR with a "mod-10 schema split". The second Rule (650) is an example of DDR with a "mod-10 table split". These two DDR types (as well as an arbitrary number of others) may be used simultaneously within the generic language. The "mod10(schoolID)" expression uses a "mod10" function against the "schoolID" variable to determine, at runtime, which database and/or table to retrieve the data from.

Figure 7:
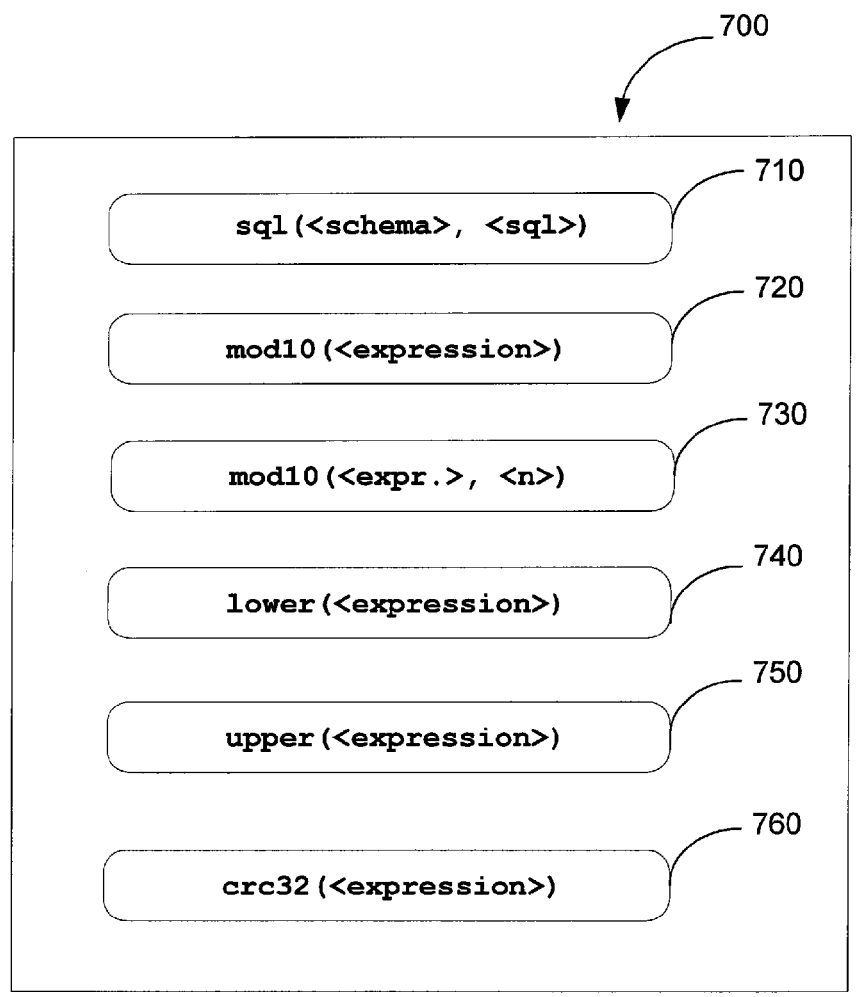
FIG. 7 is a list of function statements illustrating example embodiments of the use of the generic language in defining functions.

FIG. 7 is a list 700 of function statements illustrating example embodiments of the use of the generic language in defining functions. The generic language may support any number of functions and the functions may be used at any location within the language. The behavior of functions is programmed into the parser module 340 that processes the language. Functions may be nested to an arbitrary level of depth and may be used in a concatenated manner (in succession, but not nested).

When functions are used in a nested fashion, the parser module 340 may apply the functions in a recursive manner from the innermost expression to the outermost. Functions are typically the most useful tools for transforming data or handling DDR. In the example functions demonstrated in the list 700, function 710 may retrieve a single-row result from an Structured Query Language (SQL, developed by International Business Machines (IBM), Armonk, N.Y.) select query.

One point to note about the "sq1( )" function is that any level of nested and/or joined SQL queries may be used in the "<sq1>" section, as long as the queries effectively resolve to a "select" query. This may mean that such tasks as performing "union", "minus", or "( )" nesting operations on two or more "select" queries may be used within the sq1( ) function. Additionally, all vendor-specific database operations (e.g., Oracle functions, String concatenation, etc.) may also be used in the "<sq1>" section. In this way, database vendor-specific functions may be used to expand the number of ways that variable data may be manipulated.

The function mod(10) shown as item 720, may compute the base-10 modulus of a value (e.g., <expression>). In a more general format, example function 730 may compute the base-n modulus of a value (e.g., <expression>).

Example functions 740 and 750 may convert all letters in a value (e.g., <expression>) to lower and upper cases, respectively. The last function 760 may compute the CRC-32 (Cyclic Redundancy Check) checksum of a value (e.g., <expression>).

Figure 8:
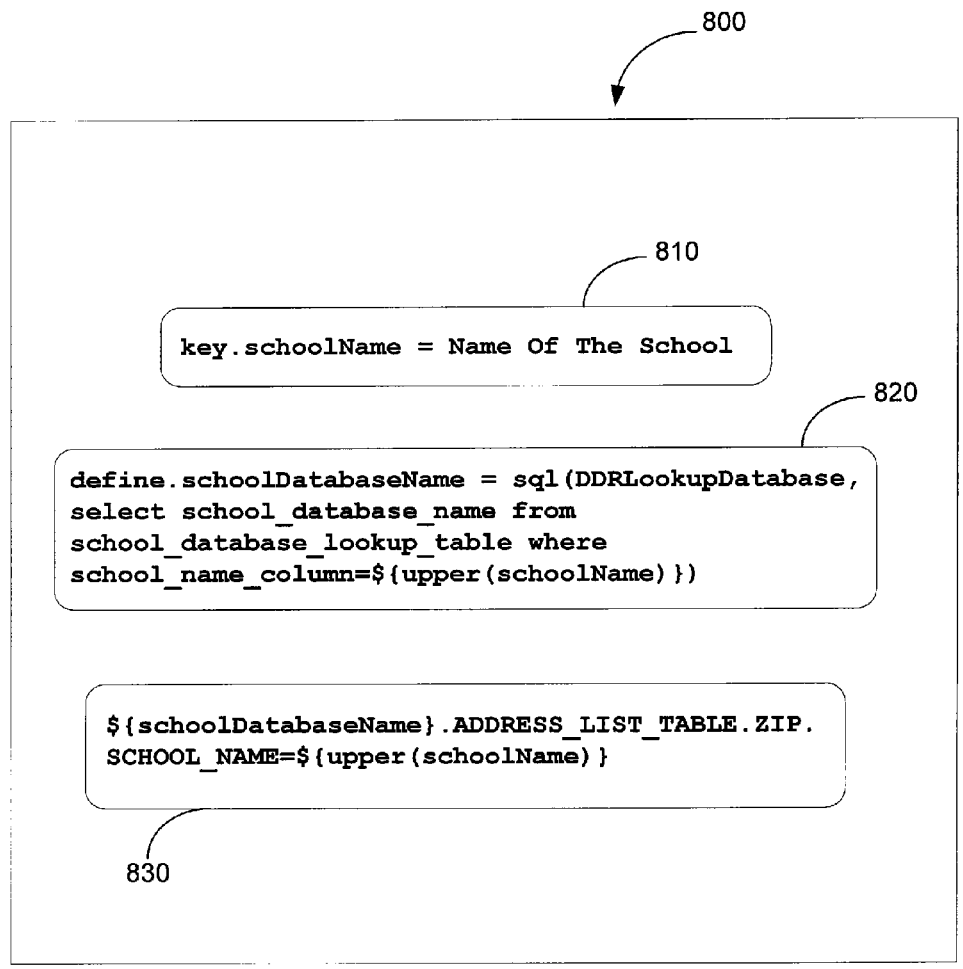
FIG. 8 is a list of statements illustrating an example embodiment of the use of defined functions in the generic language.

FIG. 8 is a list 800 of statements illustrating example embodiments of the use of defined functions in the generic language. At first, the user may be prompted for the name of the school (statement 810). The example may then use "sq1( )" and "upper( )" functions in the "define." part of the Definition (820) to dynamically retrieve the name of the database where a zip code associated with the school is located (statement 830). In this example, the "schoolDatabaseName" variable might get assigned to a value such as "SchoolDatabase3", which may then be used to retrieve the zip code associated with the school from that dynamically-retrieved database name.

Assuming all school names are stored with uppercase letters in the database, and the user is allowed to enter mixed-case information when prompted for the "Name Of The School", the "upper( )" function may be used in two places to ensure that when data is retrieved using the school name, the school name is converted to uppercase letters (see statement 820 and 830). The conversion may be necessary, in order for the school name being used to access the data matches the letter case of the data that is already in the database. This so-called "normalization" process may use functions to help ensure data (if it exists) may be found regardless of how key data is entered by the user when a Definition is being used. As mentioned earlier, other functions may be added to support other types of data normalization.

In the example statements above, reference was made to the term "Rule" in a generic language statements context. The general format of a "Rule" is as follows: <database name>.<table name>.<column name[s]>.<column filtering clause[s]> The "<database name>" section may use a "logical" name (possibly with embedded variable references) to represent one or more "physical" databases. Once any variables in the name are resolved, the name will map to exactly one physical database. Name resolution and mapping are handled by the parser module 340 which processes the Definition. This method abstracts the Definition language from physical database connection information (the database machine name, network protocol information, etc.).

The "<table name>" section may represent one or more physical tables in the specified database. Variables may also be used in this section, but no type of mapping may be performed for this section because the table name—after any variables in the section are resolved—maps to exactly one physical table.

The "<column name[s]>" section may contain exactly one of the following: The name of a single column (e.g. "SCHOOL_NAME"); The name of multiple columns via a comma-delimited list (e.g. "ID,NAME,LOCATION"); A number which represents the first "n" columns (e.g. "4"—the first 4 columns); An asterisk (i.e. "*") to indicate "all columns" in the table referenced by the Rule.

Optionally, the "<column name[s]>" section may also contain any number of variables which resolve to one of these listed items. The "<column filtering clause[s]>" section may contain one or more "clauses" which identify the way(s) to filter data in the table by particular values. Each clause may be of the format: <column name>=<filter value>.

Multiple clauses may be specified by placing a comma between each clause in the list. Variables may be used anywhere in both column names and/or filter values. An arbitrary number of rows may result from applying a filter value to a particular column In sum, this format allows a single "Rule" to specify an arbitrary number of databases, schemas, tables, columns, and data, while also resolving to exactly one database, schema, and table once a Definition is processed with user-entered "key" data.

According to one example embodiment of the method 500 described above, syntax of the generic language may remain the same when defining grouping of data corresponding to different entities. Below is an example that may combine a plurality of databases, tables, columns, and data to retrieve the ID numbers of courses in which a particular student received a letter grade of "B". This example may refer to any number of databases, tables, columns, and data, but the syntax of this example Definition does not change if any of the input data or the database-related dimensions were to change. (e.g., key.studentID=Student ID Number; key.grade=Letter Grade; key.column=Column Name; StudentDatabase${mod10(studentID)}.GRADE_${grade}_TABLE.${column}.STUDENT_ID=${studentID})

If the Definitions were processed with a "Student ID Number" of "12345", a "Letter Grade" of "B", and a "Column Name" of "COURSE_ID", the Rule in this example may resolve to: StudentDatabase5.GRADE_B_TABLE.COURSE_ID.STUDENT_ID=12345 When this resolved Rule is applied to the specified database and table, the result may retrieve zero or more rows of data from the database, depending on the number of courses this particular student has taken where a grade of "B" was received. As mentioned before, different values could be specified by a user for the "key" parameters of this Definition. Were this to occur, other data from potentially different databases, tables, and columns could be retrieved, without the need to change the Definition.

According to another example embodiment of the method 500 described above, a user may be provided with locations within the plurality of data sources containing the data corresponding to the one or more entities. The following example Rule may demonstrate this feature:

StudentDatabase${mod10(studentID)}.GRADE_${grade}_TABLE.${column}.STUDENT_ID=${studentID}

If this rule were to be resolved with specific values for the variables, one possible version of the "evaluated" Rule might be: StudentDatabase5.GRADE_B_TABLE.COURSE_ID.STUDENT_ID=12345 The above resolution shows the location of the actual data, as defined in the variables and by the "mod10" function used. The evaluation of this Rule may give exact locations in terms of one database name, one table name, and one column name, for the entity in question (course IDs which correspond to the student's "B" letter grades).

According to yet another example embodiment of the method 500 described above, a user may be provided with access to the data across multiple data sources without prior knowledge, by the user, of the data sources. The following example demonstrates this feature:

```
key.studentID = Student ID Number
StudentDatabase$ {mod10(studentID)}.-
    ADDRESS_TABLE.CITY.STUDENT_ID=$ {studentID}
```

As indicated by this Definition, student data might exist in one of several possible databases. When this Definition is processed by a parser module 340, the "user" may only be prompted for a "Student ID Number". During processing, one of the 10 possible databases will be accessed in order to retrieve the information associated with the given student (in this example, the "CITY" the student lives in), but the user of the processing module may not necessarily need to know that the data may exist in one of several possible databases, or the exact database which may contain the data. In this way, the Definition language may be capable of abstracting plurality of data sources (as well as tables and columns) from the user of a module that processes Definitions.

According to yet another example embodiment of the method 500 described above, a user may be enabled to capture data corresponding to one or more entities against a plurality of reference points in time, using the generic language. Because both (1) a Definition may be processed with a plurality of values when prompted for "key data" (e.g. a Student ID Number) by a processor 210, each value corresponding to a different reference point in time and (2) the same values may be used more than once, processing a Definition at two different points in time may yield potentially different sets of data. If a Definition is applied to the same pieces of key data at two different points in time and the data retrieved through processing is saved at the time the data is retrieved, the two sets of data retrieved may then be compared in order to determine changes made to the data over time. This "capture and compare" concept is extensible to a plurality of data sets over time.

According to yet another example embodiment of the method 500 described above, a user may be enabled to capture the data corresponding to one or more entities across the plurality of data sources, using the generic language. Because multiple Rules may be used within a given Definition, data for a particular entity may be retrieved even if said data exists in multiple databases (or "data sources"). The following example may demonstrate this feature:

```
key.studentID = Student ID Number
WestUnitedStatesDatabase.-
    STUDENT_INFO_TABLE.FIRST_NAME,LAST_NAME.-
    STUDENT_ID=$ {studentID}
EastUnitedStatesDatabase.-
    STUDENT_INFO_TABLE.FIRST_NAME,LAST_NAME.-
    STUDENT_ID=$ {studentID}
```

In the above example, two databases are considered—located in different geographic locations—which both contain the same table and columns, but most likely different data. Because it is not immediately apparent how to determine which database contains a given student's information, both databases must be queried in order to retrieve a student's data from all possible locations.

According to yet another example embodiment of the method 500 described above, a user may be enabled to capture the data corresponding to one or more entities across multiple database environments, using the generic language. Because logical name mappings may be used for references to databases in the Definition language, the physical sets of databases (e.g., a "database environment") mapped to, during Definition processing, may be arbitrarily substituted. In the case of multiple database environments where the physical databases used are different but the table and column structures contained therein are equivalent (with potentially completely different data), a Definition may be applied to multiple different database environments by changing the mapping values and not the Definition itself. This enables utilization of the language to capture data from multiple database environments which have similar structure, but different data.

Further examples of the generic language statements related to grouping of data and accessing data in a network based commerce system environment are presented below (see FIGS. 10, 11, and 12). The examples are designed to specifically address the use of tables presented in FIG. 9, described below.

Figure 9:
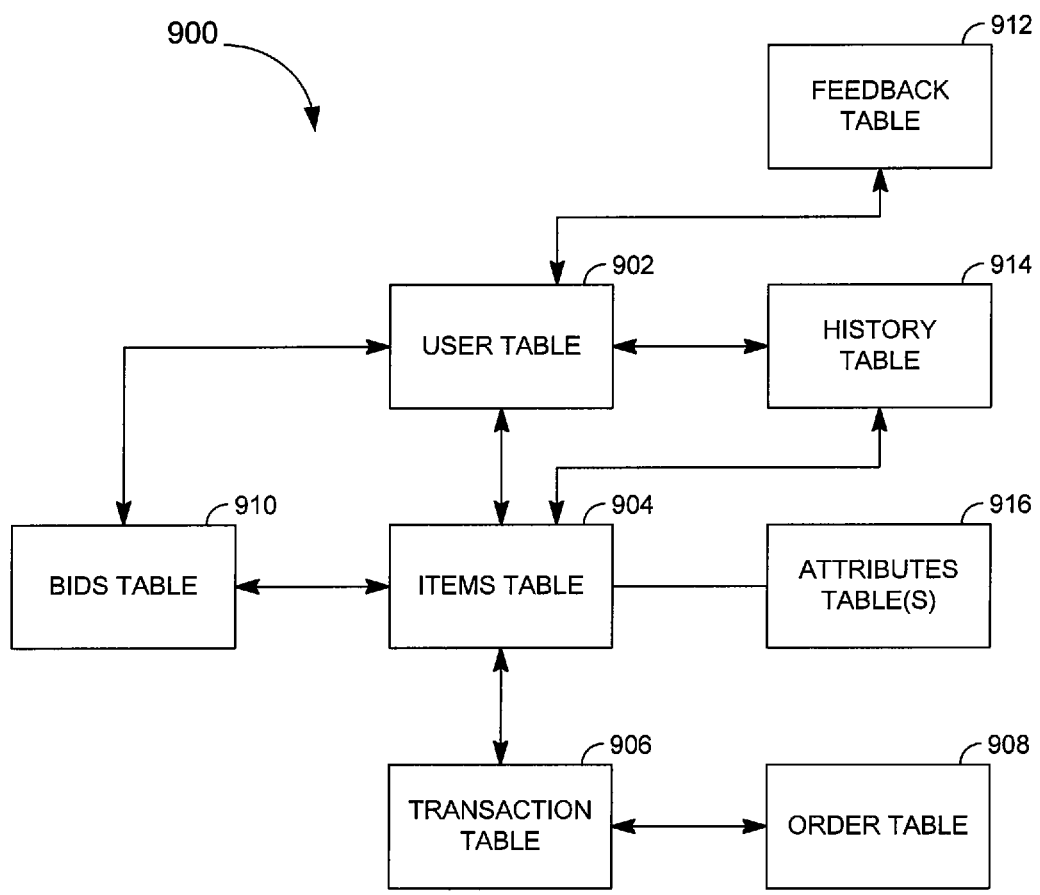
FIG. 9 is a high-level entity-relationship diagram, illustrating example tables that may be maintained within marketplace databases.

FIG. 9 is a high-level entity-relationship diagram, illustrating various tables 900 that may be maintained within the databases 426, and databases hosted by the third party servers 430 that may be utilized by and support the network-based marketplace server 402. A user table 902 contains a record for each registered user of the network-based marketplace server 402, and may include identifier, address and financial instrument information pertaining to each such registered user. A user may operate as a seller, a buyer, or both, within the network-based marketplace server 402. In one example embodiment, a buyer may be a user that has accumulated value (e.g., commercial or proprietary currency), and may then be able to exchange the accumulated value for items that are offered for sale by the network-based marketplace server 402.

The tables 900 also include an items table 904 in which may be maintained, item records for goods and services that are available to be, or have been, transacted via the marketplace server 402. Each item record within the items table 904 may furthermore be linked to one or more user records within the user table 902, so as to associate a seller and one or more actual or potential buyers with each item record.

A transaction table 906 contains a record for each transaction (e.g., a purchase transaction) pertaining to items for which records exist within the items table 904.

An order table 908 is populated with order records, each order record being associated with an order. Each order, in turn, may be with respect to one or more transactions for which records exist within the transaction table 906.

Bid records within a bids table 910 each relate to a bid received at the network-based marketplace server 402 in connection with an auction-format listing supported by the network-based marketplace server 402. A feedback table 912 is utilized, in one example embodiment, to construct and maintain reputation information concerning users.

A history table 914 maintains a history of transactions to which a user has been a party. One or more attributes tables 916 record attribute information pertaining to items for which records exist within the items table 904. Considering only a single example of such an attribute, the attributes tables 916 may indicate a currency attribute associated with a particular item, the currency attribute identifying the currency of a price for the relevant item as specified in by a seller.

Figure 10:
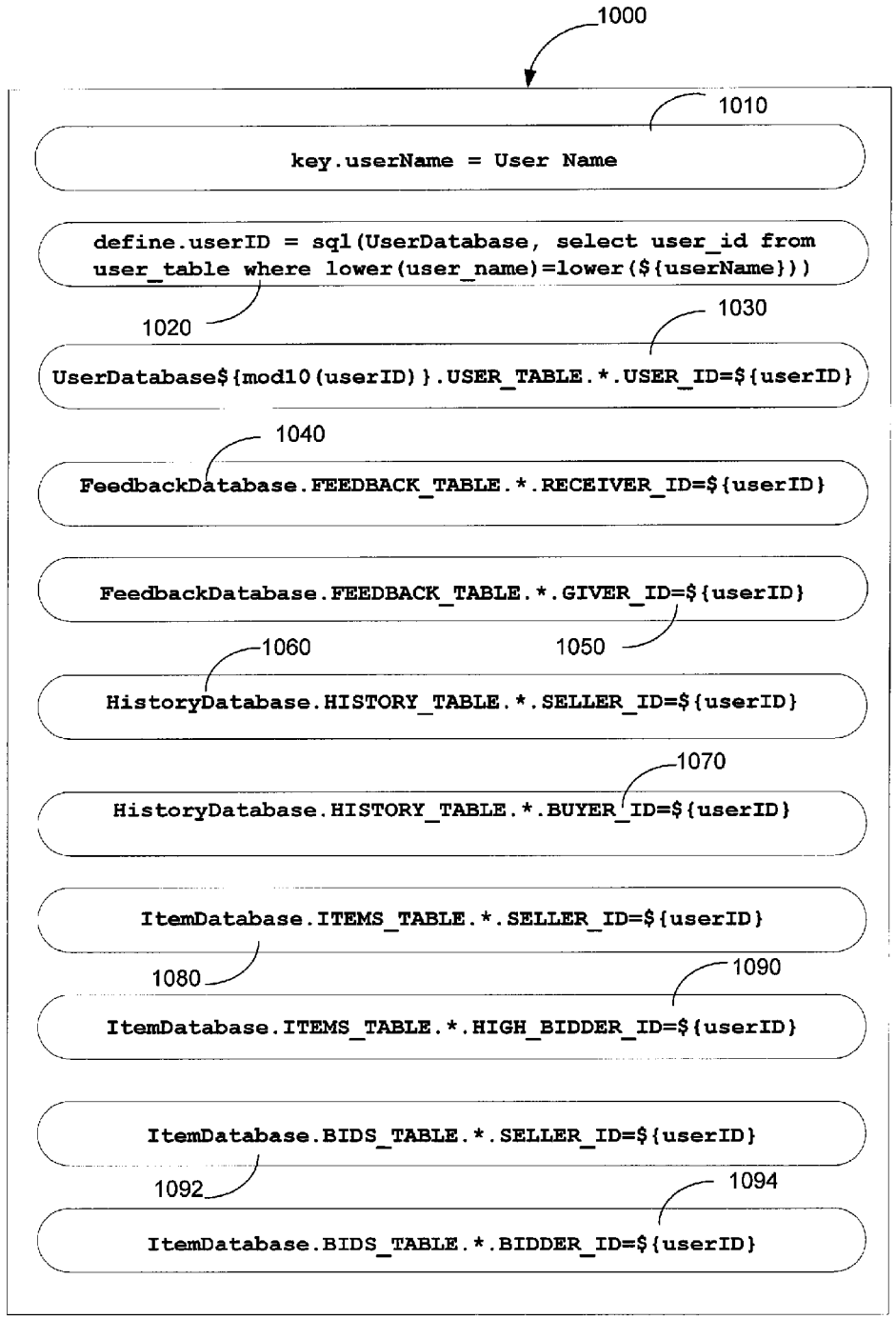
FIG. 10 is a list of statements illustrating an example embodiment of the use of the generic language in retrieving all information related to a user from the tables of FIG. 9.

FIG. 10 is a list 1000 of statements illustrating an example embodiment of the use of the generic language in retrieving all information related to a user from the tables of FIG. 9. The example assumes the tables 900 are split across multiple databases. Statement 1010 prompts a user for a User name, where the user enters the User name via the user interface 220. All information related to the user, both where the user is considered a "seller" and a "buyer", may be retrieved from the user table 902 (statement 1020 and 1030). The piece of information which determines the user's role in the information retrieved is specified by the column names in the WHERE clauses of the Rules (e.g. "SELLER_ID" and "BUYER_ID"). (see statements 1060 and 1070, respectively)

In example statement 1040, the information related the user is retrieved from the feedback table 912 of a feedback database, where the userID may identify the receiver of the feedback. Whereas, in statement 1050, the userID may identify the feedback giver.

Example statements 1060 and 1070 are directed to the history table 914 of a history database, and retrieve history of transactions to which a user has been a party as a seller and a buyer, respectively. In statements 1080 and 1090, the items table 904 of an item database is queried for a seller and a high-bidder, respectively.

Bids table 910 of the item database is queried in the example statements 1092 and 1094. In these statements bids received at the network-based marketplace server 402, in connection with an auction-format listing, are search to retrieve bids associated with a seller and a bidder, respectively.

Figure 11:
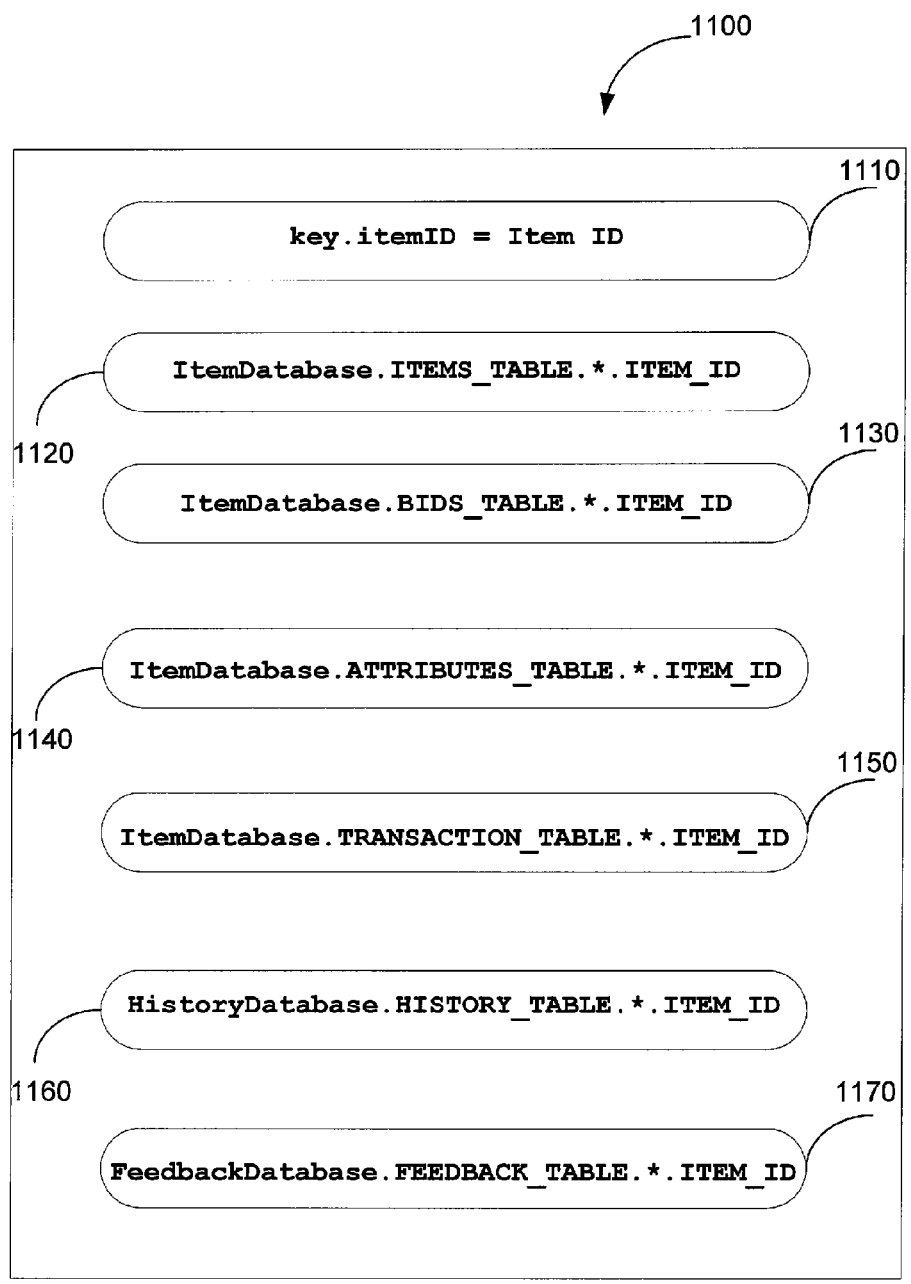
FIG. 11 is a list of statements illustrating an example embodiment of the use of the generic language in retrieving all information related to an item from the tables of FIG. 9.

FIG. 11 is a list 1100 of statements illustrating an example embodiment of the use of the generic language in retrieving all information related to an item from the tables of FIG. 9. This example assumes the tables 900 are split across multiple databases. Here in statement 1110 the user is prompted to enter an item for which the data across the tables 900 are desired. Notice that "=${itemID}" is left off of the WHERE clauses in the Rules. (see statements 1120-1170) When a Rule uses this syntax, the values assigned to the columns named in the WHERE clause may be applied in the order they appear in the "key." parts of the Definition. In this example, the ".*.ITEM_ID" part written in the first Rule (1120) may be interpreted as ".*.ITEM_ID=${itemID}" by the parser module 340 that processes Definitions. This Definition could be rewritten with the "=${itemID}" parts included at the end of each Rule, but this shorthand syntax may allow the Definition to be written in a more concise manner.

Returning to the list 1100, the statements 1120, 1130, and 1140, may retrieve information related to the item from items table 904, bids table 910, and attributes table 916, respectively. Statements 1150, 1160, and 1170 may search transaction table 906, history table 914, and feedback table 912 for information related to the item and retrieve the information from the tables. In the above paragraph, it is assumed that all specified tables except the history table 914 and the feedback table 912 may be located in an item database; and the history table 914 and the feedback table 912 may be located in a history database and a feedback database, respectively.

Figure 12:
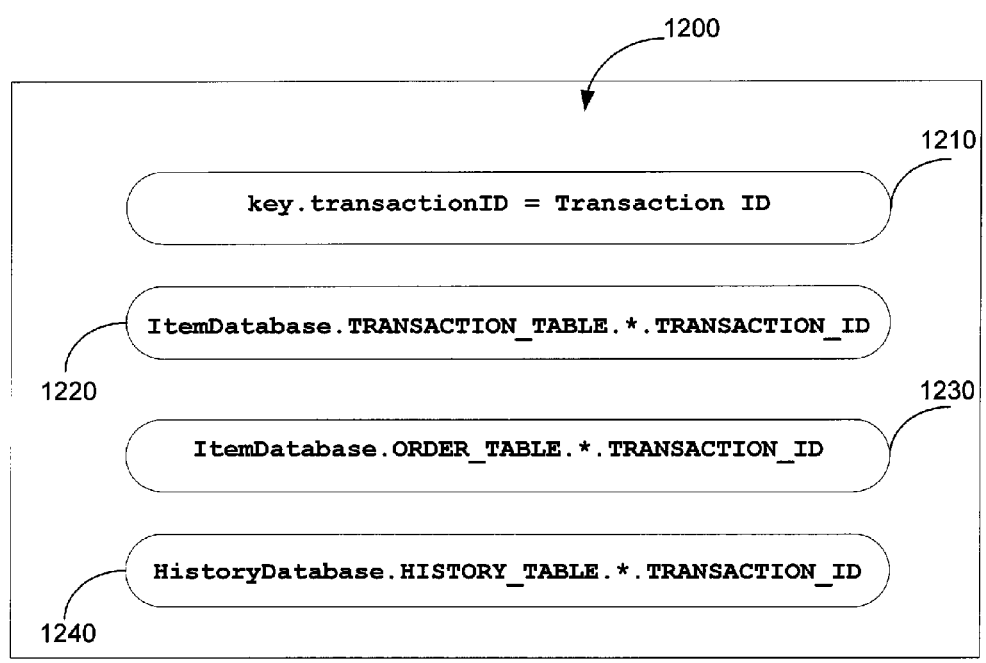
FIG. 12 is a list of statements illustrating an example embodiment of the use of the generic language in retrieving all information related to a transaction from the tables of FIG. 9.

FIG. 12 is a list 1200 of statements illustrating an example embodiment of the use of the generic language in retrieving all information related to a transaction from the tables of FIG. 9. This example assumes the tables 900 are split across multiple databases. In statement 1210, the user is prompted to enter a transaction for which the information search is desired. Statements 1220 and 1230 may search transaction table 906 and order table 908 for the information related to the transaction. It is assumed that transaction table 906 and order table 908 are included in an item database. In statement 1240, history table 914 of a history database is searched for the history of the transaction.

Machine Architecture

Figure 13:
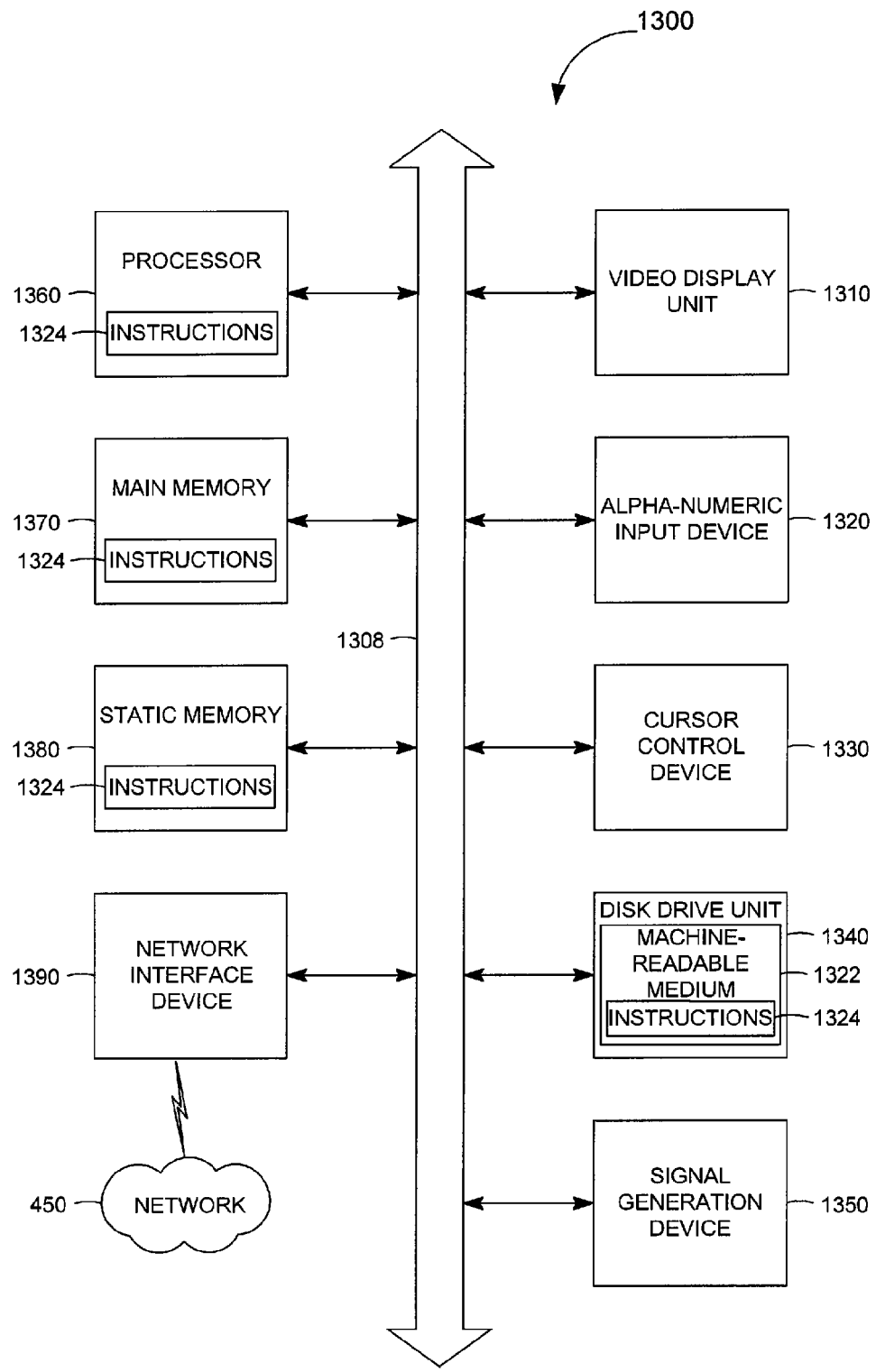
FIG. 13 is a block diagram illustrating a diagrammatic representation of a machine in the example form of a computer system.

FIG. 13 is a block diagram, illustrating a diagrammatic representation of machine 1300 in the example form of a computer system within which a set of instructions, for causing the machine to perform any one or more of the methodologies discussed herein, may be executed. In alternative embodiments, the machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 may include a processor 1360 (e.g., a central processing unit (CPU) a graphics processing unit (GPU) or both), a main memory 1370 and a static memory 1380, which communicate with each other via a bus 1308. The computer system 1300 may further include a video display unit 1310 (e.g., liquid crystal displays (LCD) or cathode ray tube (CRT)). The computer system 1300 also may include an alphanumeric input device 1320 (e.g., a keyboard), a cursor control device 1330 (e.g., a mouse), a disk drive unit 1340, a signal generation device 1350 (e.g., a speaker) and a network interface device 1390.

The disk drive unit 1340 may include a non-transitory machine-readable medium 1322 on which is stored one or more sets of instructions (e.g., software 1324) embodying any one or more of the methodologies or functions described herein. The software 1324 may also reside, completely or at least partially, within the main memory 1370 and/or within the processor 1360 during execution thereof by the computer system 1300, the main memory 1370 and the processor 1360 also constituting machine-readable media.

The software 1324 may further be transmitted or received over a network 450 via the network interface device 1390.

While the non-transitory machine-readable medium 1322 is shown in an example embodiment to be a single medium, the term "non-transitory machine-readable medium" should be taken to include a single medium or multiple media (e.g., a centralized or distributed database, and/or associated caches and servers) that store the one or more sets of instructions. The term "non-transitory machine-readable medium" shall also be taken to include any medium that is capable of storing, encoding or carrying a set of instructions for execution by the machine and that cause the machine to perform any one or more of the methodologies of the present invention. The term "non-transitory machine-readable medium" shall accordingly be taken to include, but not be limited to, solid-state memories and optical and magnetic media.

Thus, a method and a system for defining grouping of data across multiple data sources using variables and functions have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   receiving key data;
   receiving a statement belonging to a generic language relating to a plurality of entities, the statement comprising a plurality of variables defined by the generic language;
   defining, based on the statement and the key data, a grouping of data across a plurality of databases, the grouping of data corresponding to at least one entity;
   providing, based on the statement and the key data and on data-dependent routing, access to the grouping of data, the access to the grouping of data is provided to a user without prior knowledge, by the user, of the plurality of databases; and
   providing, using the generic language, access to the grouping of data corresponding to the at least one entity against a plurality of reference points in time.

2. The method of claim 1, further providing access to the data using functions defined by the generic language.

3. The method of claim 1, wherein the plurality of databases use more than one database schema.

4. The method of claim 1, wherein the statement defines an arbitrary number of databases, and wherein a syntax of the generic language remains the same when defining grouping of data corresponding to the plurality of entities.

5. The method of claim 1, wherein a user is provided with locations within the plurality of databases containing the data corresponding to the at least one entity.

6. The method of claim 1, further enabling a user to capture the data corresponding to the at least one entity across the plurality of databases, using the generic language.

7. The method of claim 1, further including:
   confirming a syntactic accuracy of the received statement, wherein the confirming includes analyzing the grammatical structure of the received statement.

8. The method of claim 1, further including:
   transforming the received statement into function components, wherein the transforming includes:
      turning the received statement into a syntax tree;
      identifying a definition embedded in the received statement using the syntax tree; and
      identifying a first rule embedded in the received statement using the syntax tree, the first rule mapping to a first database.

9. The method of claim 8, wherein the definition is an identifier number relating a noun embedded in the received statement.

10. The method of claim 8, wherein the definition is identifying based on a received location.

11. The method of claim 8, wherein the first rule maps to the first database and a plurality of other databases.

12. The method of claim 8, further including:
   identifying a second rule embedded in the received statement using the syntax tree, the second rule mapping to a second database;
   accessing the first database in the plurality of databases based on the first rule; and
   accessing the second database in the plurality of database based on the second rule, wherein the second database is different than the first database.

13. The method of claim 8, wherein the defining of the grouping of data is based on the definition and the first rule.

14. The method of claim 1, wherein the plurality of databases includes a database, a third party server, and a data source located in a cluster of host servers.

15. The method of claim 1, further including:
   normalizing the received statement by capitalizing each letter in the received key data.

16. A system comprising:
   a user interface to receive at least one statement belonging to a generic language relating to a plurality of entities;
   the user interface to present data accessed via the at least one statement belonging to the generic language; and
   a processor to:
      execute the at least one statement belonging to the generic language to define grouping of the data across a plurality of databases, the grouping of data corresponding to at least one entity;
      provide access to the data, based on data-dependent routing, using functions defined by the generic language and received in the at least one statement, wherein the access to the data is provided to a user without prior knowledge, by the user, of the plurality of databases; and
      provide access, using the generic language, to the data corresponding to the at least one entity against a plurality of reference points in time.

17. The system of claim 16, further comprising one or more servers to host the plurality of databases.

18. The system of claim 16, further comprising a storage unit to store variables and functions defined by the generic language.

19. The system of claim 16, wherein the processor is to provide access to the data, based on data-dependent routing, using variables defined by the generic language.

20. A non-transitory machine-readable storage medium embodying a generic language relating to a plurality of entities, the machine-readable medium comprising instructions, which when implemented by one or more processors of a machine, cause the machine to perform operations comprising:
   receiving key data;
   receiving a statement belonging to a generic language relating to a plurality of entities, the statement comprising a plurality of variables defined by the generic language;

defining, based on the statement and the key data, data across a plurality of databases, the data corresponding to at least one entity across a plurality of databases;

providing access to the data, based on data-dependent routing, using variables defined by the generic language and received in the statement and the key data;

providing a user with access to the data across the plurality of databases without prior knowledge, by the user, of the plurality of databases; and providing access, using the generic language, to the data corresponding to at least one entity against a plurality of reference points in time.

21. The non-transitory machine-readable storage medium of claim 20, wherein the operations further comprising providing access to the data, based on data-dependent routing, using functions defined by the generic language and received in the statement and the key data.

* * * * *